3,392,088
CONTROL OF REFLUX TO A FRACTIONATOR
Merion L. Johnson, Bartlesville, Okla., assignor to Phillips
Petroleum Company, a corporation of Delaware
Filed Dec. 9, 1963, Ser. No. 329,054
6 Claims. (Cl. 203—1)

ABSTRACT OF THE DISCLOSURE

In a fractional distillation column the internal reflux is controlled by manipulating the flow rate of the condensed external reflux in accordance with one of the implicit equations:

$$R_e = \frac{R_i - R_e}{K \Delta T}$$

and $$R_e = R_i - R_e(K \Delta T)$$

where:
$R_i$ = internal reflux flow rate;
$R_e$ = external reflux flow rate;
$K$ = the ratio of the specific heat of external reflux to the heat of vaporization of liquid on the top tray; and
$\Delta T$ = difference between the temperature of liquid on top tray and the temperature of the external reflux.

Background of the invention

This invention relates to the control of reflux to a fractionator. In another aspect, it relates to a mehod and apparatus for computing and controlling the flow of external reflux to a fractional distillation column.

There is ever-increasing activity in the art of fractionating multi-component mixtures to optimize this type of separation. For example, in the case of fractional distillation columns, many methods and means have been proposed, patented or used in an effort to reduce the column's numerous degrees of freedom, which are characterized as independent input variables, some of which are controllable, e.g., feed temperature, and others of which are uncontrollable, e.g., ambient temperature.

A recent improvement in controlling fractional distillation columns is the automatic control of internal reflux, which is defined as the sum of the external reflux fed to the top of the column plus the vapor which is condensed on the tray at the top of the column by said external reflux. The internal reflux can be calculated by the following equation or explicit function, derived from the material and heat balances on the top tray:

$$R_i = R_e + R_e \left(\frac{C_p}{\lambda}\right) \Delta T \qquad (1)$$

which can be rewritten as:

$$R_i = R_e(1 + K \Delta T) \qquad (2)$$

where:
$R_i$ = mass flow rate of liquid leaving the top tray in the column (or internal reflux flow rate) (lbs./hr.)
$R_e$ = mass flow rate of liquid entering top tray (or external reflux flow rate) (lbs./hr.)
$C_p$ = specific heat of external reflux (B.t.u./(lb.×° F.)
$\lambda$ = heat of vaporization of liquid on top tray (B.t.u./lb.)
$K = C_p/\lambda$
$\Delta T = T_0 - T_R$ (° F.)
$T_0$ = temperature of liquid on top tray (° F.)
$T_R$ = temperature of external reflux (° F.)

Thus, the internal reflux can be computed from the measurement of differential temperature $\Delta T$ and external reflux flow rate $R_e$. The constant $K$ is quite insensitive to composition changes for any one particular fractionator.

It can be seen that a change in $\Delta T$ can be compensated by manipulating the external reflux flow rate $R_e$ to hold the internal reflux flow rate $R_i$ constant. Regardless of whether a change originates in the column or without, the internal reflux flow rate $R_i$ can be maintained constant by manipulating the external reflux flow rate $R_e$. This method of controlling the internal reflux flow rate is of particular value where air-fan coolers are used for reflux condensation, which method compensates for the changes in ambient conditions which would otherwise affect such condensation.

Equation 2 can be rewritten in explicit form as $$R_e = \frac{R_i}{(1 + K \Delta T)} \qquad (3)$$

Automatic manipulation of external reflux in accordance with this equation is especially useful since it is not necessary to actually measure the flow rate of the external reflux, for example by sensing the pressure difference across an orifice in the flow conduit and transmitting the pressure differential as a pneumatic signal (which transmission may give rise to problems in control due to inherent transmission lags, e.g., in the case where the signal is transmitted a substantial distance). In this method, the desired $R_i$ is inserted as a computer-controller setpoint, and the demanded $R_e$ is computed and applied to the field-mounted external reflux controller as its setpoint. However, when control of external reflux in accordance with Equation 3 is accomplished with analog computing elements, certain disadvantages are usually inherent in such a computing-controlling system. In such a case, an analog divider is used to compute the quotient $R_i/(1+K \Delta T)$ and such instrumentation will often be somewhat insensitive to changes in $\Delta T$. In the usual cases, $K \Delta T$ will have a maximum value of 0.25 or less, e.g., 0.25 to 0, in which case $1+K \Delta T$ will be 1.25 to 1.0, which range is only about one-fifth the full range which must be provided. As a consequence, the accuracy of the computing and therefore the control over external reflux flow rate is less than desired.

Accordingly, an object of this invention is to improve the control over the reflux to a fractionator. Another object is to provide an improved method for controlling the flow of external reflux to a fractional distillation column. Another object is to provide improved apparatus for exercising such control. Other objects and advantages of this invention will become apparent to those skilled in the art from the following description, appended claims, and accompanying drawing, the single figure of which is a schematic diagram of a distillation column, provided with certain features of this invention.

I have discovered that the external reflux can be accurately and advantageously controlled in accordance with the equation:

$$R_e = \frac{R_i - R_e}{K \Delta T} \qquad (4)$$

or from the equation:

$$R_e = R_i - R_e(K \Delta T) \qquad (5)$$

where $R_e$, $R_i$, $K$ and $\Delta T$ are as defined above. Note that in Equations 4 and 5, both of which are implicit functions, that the term $K \Delta T$ varies over the full range as $\Delta T$ varies and thus the inherent insensitivity of an analog instrument when used to compute the ratio $(R_i - R_e)/K \Delta T$ of Equation 4 or the product $R_e(K \Delta T)$ of Equation 5 will have a much lesser effect on the accuracy of the computation of $R_e$.

The improvement in accuracy of the computation of $R_e$ by this invention can be shown by a mathematical analysis of Equations 3 and 4 by assuming a fractional error ε assigned to the analog instrument used in solving such equations. Such analysis of Equation 3 gives:

$$R_e' = (1+\epsilon)\frac{R_i}{(1+K\Delta T)} \quad (6)$$

or $$R_e' = R_e + \Delta^4 R_e \quad (7)$$

where $R_e'$ is the output of the analog divider and $\Delta R_e$ is the error in the output. Substitution of Equation 7 in Equation 6 and solution of the substituted equation gives:

$$\Delta R_e = \epsilon \frac{R_i}{(1+K\Delta T)} \quad (8)$$

or $$\Delta R_e = \epsilon R_e \quad (9)$$

Similar analysis of Equation 4 gives:

$$R_e' = (1+\epsilon)\frac{R_i - (R_e + \Delta R_e)}{K\Delta T} = R_e + \Delta R_e \quad (10)$$

Solution of Equation 10 for the error in output gives:

$$\Delta R_e = \epsilon R_e \frac{K\Delta T}{(1+K\Delta T + \epsilon)} \quad (11)$$

Comparison of Equations 9 and 11 shows that the error of computing $R_e$ with such an analog divider is reduced by the factor $K\Delta T/(1+K\Delta T+\epsilon)$, this factor in the usual case being less than one-fifth. Similar analysis of Equation 5 for the same error in output gives:

$$\Delta R_e = \epsilon R_e \left[ -\frac{K\Delta T}{1+K\Delta T + \epsilon(K\Delta T)} \right] \quad (12)$$

The magnitude of the error in the output signal expressed by Equation 12 will be about the same as that expressed by Equation 11. Thus, the accuracy of computing $R_e$ according to this invention will usually be at least five times greater as compared to the accuracy of computing $R_e$ according to Equation 3. Such accuracy will be even greater for smaller values of $K\Delta T$.

*Description of the preferred embodiments*

Figure 1:
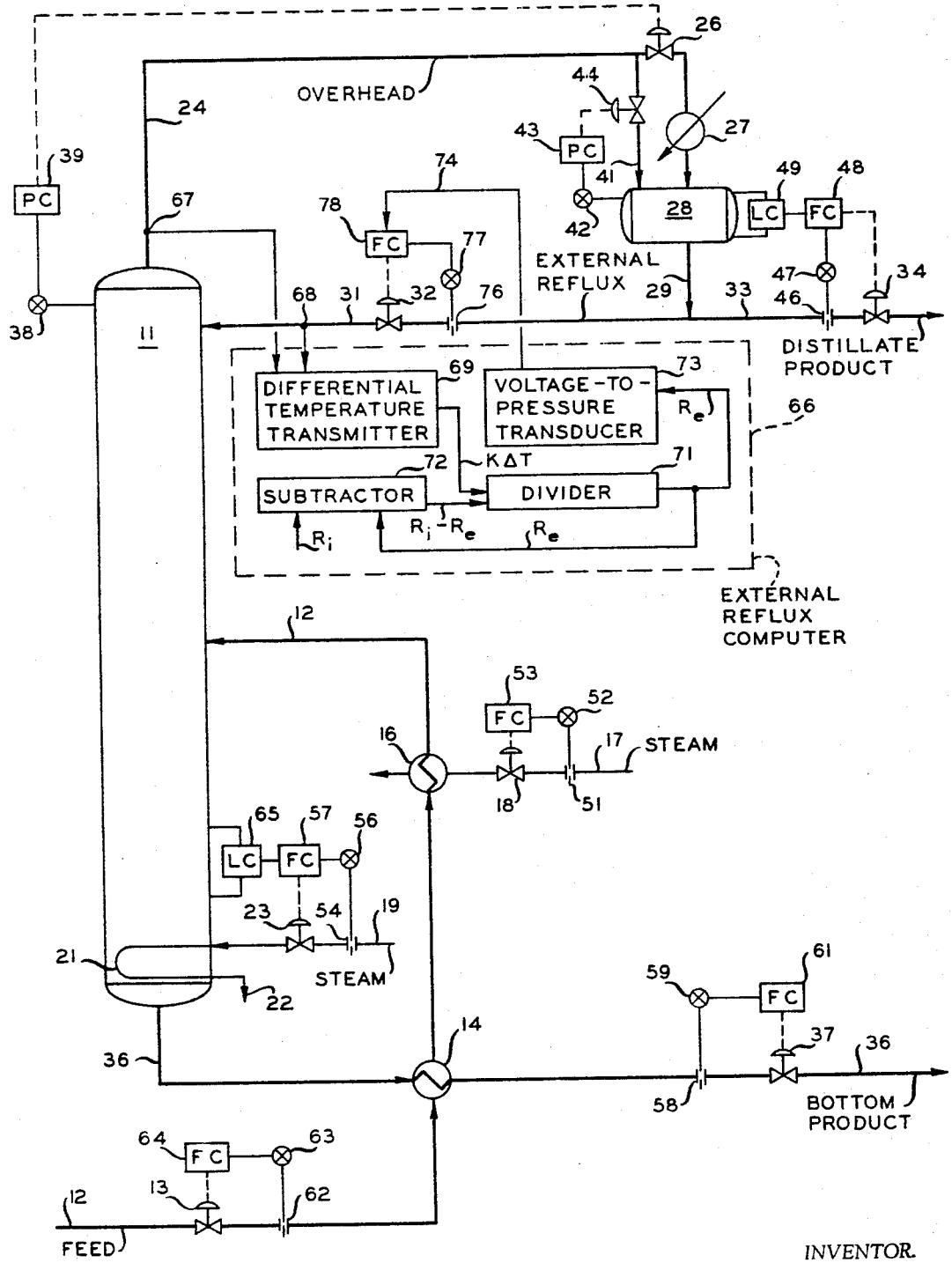
FIGURE 1 is a diagrammatic representation of a fractionation system having one embodiment of the control system of this invention incorporated therein.

Referring now to FIGURE 1 of the drawing, there is shown a conventional fractional distillation column 11, which can be provided with a plurality of vertically-spaced liquid-vapor contact trays (not shown). Feed comprising a multicomponent mixture to be separated is supplied via line 12 and introduced onto a feed tray in column 11 located at an intermediate level therein, the flow rate of the feed being controlled by valve 13. Feed line 12 is associated with an indirect heat exchanger or economizer 14 and a second indirect heat exchanger or preheater 16. An indirect heat exchange medium such as steam is supplied via line 17 to preheater 16, the flow rate of the heat exchange medium being controlled by valve 18. Heat is supplied to the kettle of column 11 by supplying steam or other heat exchange medium from line 19 to reboiler coil 21, the condensed heat exchange medium being withdrawn from the coil via line 22. The flow rate of the heat exchange medium in line 19 is controlled by valve 23. Vapors are removed from the top of column 11 through overhead line 24, the flow rate being controlled by valve 26, and passed through a cooler 27 such as an air-cooled condenser, the resulting liquid being passed to an accumulator 29. Liquid distillate in accumulator 28 is withdrawn via line 29, and a portion of this withdrawn liquid is recycled via line 31 as external reflux to the top of column 11, the flow rate of the external reflux being controlled by valve 32. The balance of the liquid distillate withdrawn from accumulator 28 is removed from the system through line 33 and yielded as distillate product, the flow rate being controlled by valve 34. Bottom product is withdrawn from the kettle of column 11 via line 36 and it is passed in indirect heat exchange relationship through economizer 14 with the feed in line 12, the flow rate of the bottom product being controlled by valve 37.

The degrees of freedom of the distillation column of FIGURE 1 can be reduced by providing it with minimum controls well known in the art. Referring now to the drawing, a constant pressure in the top of column 11 can be maintained by an assembly comprising a pressure transducer 38 and pressure controller 39 in conjunction with control valve 26. A constant pressure can be maintained in accumulator 28 by passing a small amount of overhead from line 24 directly to accumulator 28 via by-pass line 41, the constant pressure being provided by an assembly comprising pressure transducer 42, pressure controller 43 and flow control valve 44. The flow rate in distillate product line 33 can be controlled by an assembly comprising orifice plate 46, differential pressure transducer 47 and flow controller 48 in conjunction with control valve 34, the setpoint of flow controller 48 being manipulated by a liquid level controller 49 associated with accumulator 28, so as to maintain a constant liquid level in the accumulator. The volume flow rate of steam in line 17 can be controlled by an assembly comprising orifice plate 51, differential pressure transducer 52 and flow controller 53 in conjunction with flow control valve 18. The volume flow rate of steam in line 19 can be controlled by an assembly comprising orifice plate 54, differential pressure transducer 56 and flow controller 57 in conjunction with flow control valve 23. The flow rate of bottom product in line 36 can be controlled by an assembly comprising orifice plate 58, differential pressure transducer 59 and flow controller 61 in conjunction with control valve 37. Similarly, the flow rate of feed in line 12 can be controlled by an assembly orifice plate 62, differential pressure transducer 63 and flow controller 64 in conjunction with flow control valve 13. Further reduction in the degrees of freedom of the column can be accomplished by using the level of liquid in the kettle of column 11 to manipulate the volume of steam passed via line 19 to coil 21. This can be done by an assembly comprising a liquid level controller 65 which manipulates the setpoint of flow controller 57. The use of these minimum control features of the prior art reduces the number of the degrees of freedom of the column.

A preferred embodiment of the control scheme of this invention is also illustrated in the drawing and designated by broken line 66. The term $\Delta T$ of Equation 4 is measured by comparing the temperature $T_O$ of the vapor removed from the top of column 11 with the temperature $T_R$ of the external reflux passed to the column. This can be accomplished by the use of suitable temperature sensing elements 67 and 68, respectively, such as thermocouples which are connected in opposition to each other. The signals from temperature sensing elements 67 and 68 are applied as inputs to a differential temperature transmitter 69, which provides an output signal representative of $K\Delta T$, the constant $K$ being provided by adjustment of the span of the transmitter. Alternatively, signal $\Delta T$ can be passed to a multiplier such as a potentiometer where it is multiplied by $K$. Signal $K\Delta T$ is applied as a first input signal to an analog divider 71. In an alternative embodiment, instead of actually measuring $T_O$ and producing a signal representative of such measurement, a signal can be produced, for example by means of an adjustable voltage source, representative of a fixed reference temperature which is in turn representative of the bubble point temperature of the external reflux at the pressure within the fractionator. Analog subtractor 72 receives a first input signal $R_i$ which is subtracted from a second input signal $R_e$. The output signal from subtractor 72, proportional to $R_i - R_e$, is supplied as a second input signal to divider 71. The latter produces an output signal proportional to $R_e$ and it is supplied as the second input or feedback signal to subtractor 72 in a continuous fashion for the continuous implicit solution of Equation 4 and the production of a control signal $R_e$ which is used to control the flow of external reflux in flow line 31. In other words, $R_e$ is fed back for use in finding its own value. In the preferred instance where such computation is done electronically and $R_e$ is produced as an electrical signal, this signal is submitted to a voltage-to-pressure transducer 73 where the electronic control signal is converted to a pneumatic control signal 74. The latter signal is employed as a setpoint for flow control assembly comprising orifice plate 76, pressure transducer 77, flow controller 78 and flow control valve 32.

The input signal $R_i$ to subtractor 72 can be supplied as a constant, based on empirical knowledge of the fractional distillation operation, from a suitable adjustable voltage source, thus constituting an adjustable internal reflux setpoint. Alternatively, it can be supplied as a continuously predicted value determined by the method disclosed and claimed in copending application Serial No. 189,375 filed April 23, 1962, by Dale E. Lupfer, now U.S. Patent No. 3,296,097.

Figure 2:
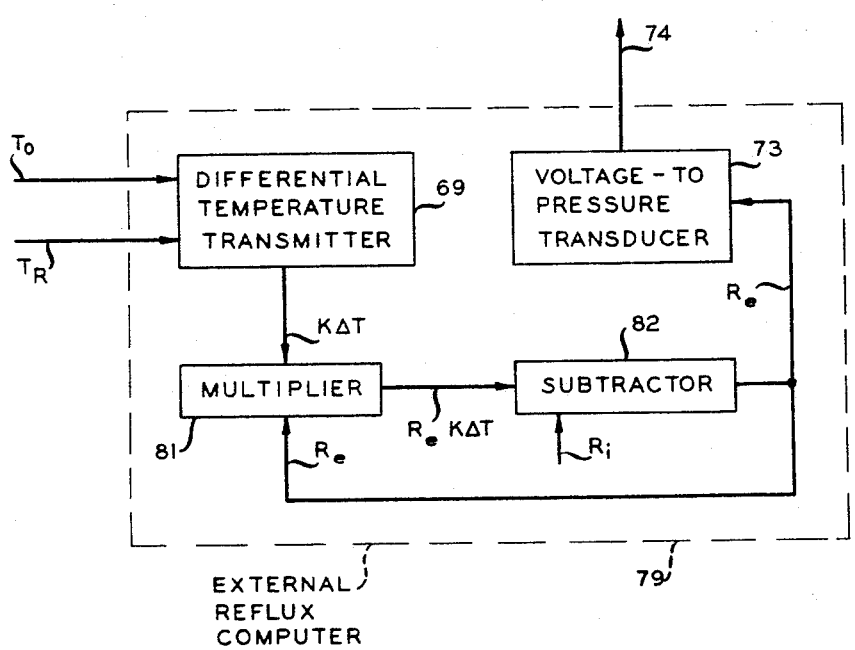
FIGURE 2 is a diagrammatic representation of a second embodiment of the control system of this invention.

In FIGURE 2, an external reflux computer 79 is shown which can be used to solve Equation 5 and which can be used in place of computer 66 of FIGURE 1. The operation of computer 79 should be obvious in view of the foregoing.

In the preferred control system of this invention, the various computing components necessary in the solution of Equation 4 and the control of external reflux are electronic analog components. For example, the differential temperature transmitter 69 can be a Low Level Differential Amplifier, Type 6.422, described in Bulletin No. AC 6201-1 of Electronic Associates, Inc., Long Branch, N.J.; subtractors 72 and 82 can be Dual Operational Amplifiers, Type 6.368, described in said bulletin, and divider 71 and multiplier 81 can be Quarter Square Multipliers, Type 7.081, described in the latter bulletin. Alternatively, said computing components can be of the pneumatic type. For example, differential temperature transmitter 69 can be a Potentiometer Transmitter 700T, Model 2, described in Bulletin 12A100 of the Taylor Instrument Co., Rochester, N.Y.; subtractors 72 and 82 can be Computing Relays Model 56-1, described in Technical Information Bulletin 37-57A of the Foxboro Instrument Co., Foxboro, Mass.; and divider 71 and multiplier 81 can be Sorteberg Force Bridges, Type C, described in Catalog C80-1 of the Minneapolis Honeywell Co., Philadelphia, Pa.

As an example, the distillation column 11 of the foregoing discussion and shown in FIGURE 1 is used as a debutanizer to separate a mixture of hydrocarbons and to produce a distillate product comprising isopentane, normal butane, isobutane, and propane and a bottom product comprising normal butane, isopentane, normal pentane, and some components heavier than normal pentane which are designated as $C_6+$. Assume that K is equal to 0.004, $\Delta T$ is equal to 20° F., and the desired $R_i$ is 2000 bbls./hr. Signals proportional to these values are fed into external reflux computer 66 and the latter (disregarding any error) produces an output control signal 74 proportional to 1851.8 bbls./hr. Assume, however, that analog divider 71 has an error of $\pm 3\%$; thus, with input signals X and Y, its output is $X/Y \pm 0.03(X/Y)$, or, in the case of a high (or positive) error, the output is $1.03(X/Y)$. According to Equation 4, such divider will by implicit computation solve the equation:

$$R_e = (1.03) \frac{2000 - R_e}{(0.004)(20)}$$

to produce an output signal $R_e$ of 1855.8 bbls./hr., which value is only 4.0 bbls./hr. in error and which value actually would be required to satisfy an $R_i$ of 2004.3 bbls./hr.

However, this error is far less than that which would result if the divider 71 (with the $+3\%$ error) were required to solve Equation 3, viz, $$R_e = (1.03) \frac{2000}{1 + (0.004)(20)}$$

in which case it would produce an output signal $R_e$ of 1907.4 bbls./hr., which value is 55.6 bbls./hr. in error and which value actually would be required to satisfy an $R_i$ of 2060 bbls./hr. Thus, use of divider 71 to solve for $R_e$ by Equation 4 instead of Equation 3 reduces the error by a factor of 55.6/4 or 13.9 to 1.

Using the same values for K, $\Delta T$, and $R_i$, and assuming analog multiplier 81 has the same positive error in output of 0.03%, the analog computer 79 of FIGURE 2, in solving Equation 5, would produce an output signal $R_e$ of 1847.7 bbls./hr., which value is only 4.1 bbls./hr. in error, which is of the same order of magnitude as that of computer 66 of FIGURE 1.

Various modifications and alterations of this invention will become apparent to those skilled in the art from the foregoing discussion and accompanying drawing without departing from the scope and spirit of this invention; and, it should be understood that this invention is not to be limited unduly to those preferred embodiments set forth herein for illustrative purposes.

I claim:

1. In a fractionation process wherein a multicomponent feed mixture to be separated is introduced into a fractionation column, vapor is removed from the top of said column, and said vapor is condensed and a portion of the resulting condensate is introduced into the top of said column as external reflux; a control method comprising measuring the temperature of said vapor and producing a first signal representative thereof, measuring the temperature of said external reflux and producing a second signal representative thereof, producing responsive to said first and second signals a third signal $\Delta T$ representative of the difference between said first and second signals, establishing a fourth signal K representative of the ratio of the specific heat of said external reflux to the heat of vaporization of liquid in the top of said column, producing responsive to said third and fourth signals a fifth signal $K\Delta T$ representative of the multiplication product of said third and fourth signals, establishing a sixth signal $R_i$ representative of the desired internal reflux flow rate in said column, producing responsive to said sixth signal and a seventh signal an eighth signal representative of the difference between said sixth and seventh signals, producing responsive to said fifth and eighth signals a ninth signal representative of the ratio of said eighth signal to said fifth signal, using said ninth signal as said seventh signal for the above-recited step of producing said eighth signal, measuring the actual flow rate of said external reflux and producing a tenth signal representative of said actual flow rate, comparing said ninth and tenth signals and manipulating the flow rate of said external reflux in accordance with the resulting comparison to maintain the flow rate of said internal reflux at its said desired value.

2. In a fractionation process wherein a multicomponent feed mixture to be separated is introduced into a fractionation column, vapor is removed from the top of said column, and said vapor is condensed and a portion of the resulting condensate is introduced into the top of said column as external reflux; a control method comprising measuring the temperature of said vapor and producing a first signal thereof, measuring the temperature of said external reflux and producing a second signal representative thereof, producing responsive to said first and second signals a third signal $\Delta T$ representative of the difference between said first and second signals, establishing a fourth signal K representative of the ratio of the specific heat of said external reflux to the heat of vaporization of liquid in the top of said column, producing responsive to said third and fourth signals a fifth signal KΔT representative of the multiplication product of said third and fourth signals, producing responsive to said fifth signal and a sixth signal a seventh signal representative of the multiplication product of said fifth and sixth signals, establishing an eighth signal $R_i$ representative of the desired internal reflux flow rate in said column, producing responsive to said seventh and eighth signals a ninth signal representative of the difference between said seventh and eighth signals, using said ninth signal as said sixth signal for the above-recited step of producing said seventh signal, measuring the actual flow rate of said external reflux and producing a tenth signal representative of said actual flow rate, comparing said ninth and tenth signals and manipulating the flow rate of said external reflux in accordance with the resulting comparison to maintain the flow rate of said internal reflux at said desired value.

3. In a fractionation system comprising a fractionation column, first conduit means for introducing a multi-component feed mixture to be separated into said column, second conduit means for removing vapor from the top of said column, means for condensing at least a portion of the thus-removed vapor and third conduit means for passing at least a portion of the resulting condensate as external reflux into the top of said column; a control system comprising means to establish a first signal representative of the quantity KΔT where K is a constant representing the ratio of the specific heat of said external reflux to the heat of vaporization of liquid in the top of said column and ΔT is representative of the difference between the temperature of said vapor and the temperature of said external reflux; signal subtracting means to produce a second signal and having a signal input and a set point input with the signal applied to said set point input being representative of the desired value of internal reflux, said second signal being representative of the difference between said set point input and said signal input; signal divider means having first and second inputs; means for applying said first signal to said first input of said signal divider means; means to apply said second signal from said signal subtracting means to said second input of said signal divider means; said signal divider means being responsive to said first and second signals for producing a third signal representative of the ratio of said second signal to said first signal; means to apply the third signal from said signal divider means to said signal input of said signal subtracting means; means to manipulate the flow rate of said external reflux and means to apply the third signal from said signal divider means to said means to manipulate the flow rate of said external reflux to cause such manipulation to be responsive to said third signal.

4. In a fractionation system comprising a fractionation column, first conduit means for introducing a multicomponent feed mixture to be separated into said column, second conduit means for removing vapor from the top of said column, means for condensing at least a portion of the thus-removed vapor and third conduit means for passing at least a portion of the resulting condensate as external reflux into the top of said column; a control system comprising means to establish a first signal representative of the quantity KΔT where K is a constant representing the ratio of the specific heat of said external reflux to the heat of vaporization of liquid in the top of said column and ΔT is representative of the difference between the temperature of said vapor and the temperature of said external reflux; signal multiplier means having first and second inputs for producing responsive to the signals applied to said first and second inputs a second signal representative of the multiplication product of said signals applied to said first and second inputs; means to connect the output of said means to establish a first signal to said first input of said signal multiplier means; signal subtractor means having first and second inputs for producing a third signal representative of the difference between the signals applied to said first and second inputs of said signal subtractor means; means for applying to said first input of said signal subtractor means a set point signal representative of the desired value of internal reflux; means to connect the output of said signal multiplier means to said second input of said signal subtractor means; means to connect the output of said signal subtractor means to said second input of said signal multiplier means; means to manipulate the flow rate of said external reflux to said output of the signal subtratcor means; and means to connect the output of said signal subtractor means to an input of said means to manipulate the flow rate of said external reflux to cause such manipulation to be responsive to said third signal.

5. In a fractionation system comprising a fractionation column, first conduit means for introducing a multi-component feed mixture to be separated into said column, second conduit means for removing vapor from the top of said column, means for condensing at least a portion of the thus-removed vapor and third conduit means for passing at least a portion of the resulting condensate as external reflux into the top of said column; a control system comprising a first temperature sensing means to establish a first signal representative of the temperature of said vapor; a second temperature sensing means to establish a second signal representative of the temperature of said external reflux; differential temperature transmitter means having first and second signal inputs for establishing a third signal representative of the quantity KΔT where K is a constant representing the ratio of the specific heat of said external reflux to the heat of vaporization of liquid in the top of said column and ΔT is representative of the difference between the signals applied to said first and second signal inputs; means to connect the output of said first temperature sensing means to said first signal input of said differential temperature transmitter means; means to connect the output of said second temperature sensing means to said second signal input of said differential temperature transmitter means; a subtractor having a signal input and a set point input with the signal applied to said set point input being representative of the desired value of internal reflux, said subtractor producing a fourth signal representative of the difference between the signal applied to said signal input of said subtractor and the signal applied to said set point input; a divider having first and second inputs for producing a fifth signal representative of the ratio of the signals applied to said first input of said divider to the signal applied to the second input of said divider; means to connect the output of said differential temperature transmitter means to said second input of said divider; means to connect the output of said subtractor to said first input of said divider; means to connect the output of said divider to said signal input of said subtractor; means to manipulate the flow rate of said external reflux responsive to a control signal; and means to connect the output of said divider to said means to manipulate as said control signal.

6. In a fractionation system comprising a fractionation column, first conduit means for introducing a multi-component feed mixture to be separated into said column, second conduit means for removing vapor from the top of said column, means for condensing at least a portion of the thus-removed vapor and third conduit means for passing at least a portion of the resulting condensate as external reflux into the top of said column; a control system comprising a first temperature sensing means to establish a first signal representative of the temperature of said vapor; a second temperature sensing means to establish a second signal representative of the temperature of said external reflux; a differential temperature transmitter means having first and second signal inputs for producing a third signal representative of the quantity K∆T where K is a constant representing the ratio of the specific heat of said external reflux to the heat of vaporization of liquid in the top of said column and ∆T is representative of the difference between the signals applied to said first and second signal inputs; means to connect an output of said first temperature sensing means to said first signal input of said differential temperature transmitter means; means to connect an output of said second temperature sensing means to said second signal input of said differential temperature transmitter means; a multiplier having first and second inputs for producing a fourth signal representative of the multiplication product of the signals applied to said first and second inputs of said multiplier; means to connect the output of said differential temperature transmitter means to said first input of said multiplier; a subtractor having first and second signal inputs for producing a fifth signal representative of the difference between the signals applied to said first and second inputs of said subtractor; means for applying to said first input of said subtractor a signal representative of the desired value of internal reflux; means to connect the output of said multiplier to said second input of said subtractor; means to connect an output of said subtractor to said second input of said multiplier; means to manipulate the flow rate of said external reflux responsive to a control signal; and means to connect the output of said subtractor to said means to manipulate as said control signal.

References Cited

UNITED STATES PATENTS

| | | | |
|---|---|---|---|
| 3,085,050 | 4/1963 | Kleiss | 235—151.12 |
| 3,107,293 | 10/1963 | Tolin | 235—151.12 |
| 3,271,269 | 9/1966 | Walker | 202—160 |
| 3,271,270 | 9/1966 | Lupfer et al. | 203—2 |
| 3,296,097 | 1/1967 | Lupfer | 203—2 |

WILBUR L. BASCOMB, JR., *Primary Examiner.*